Sept. 4, 1945. F. F. KISHLINE 2,384,096
BODY MOUNT
Filed Nov. 14, 1940 3 Sheets-Sheet 1
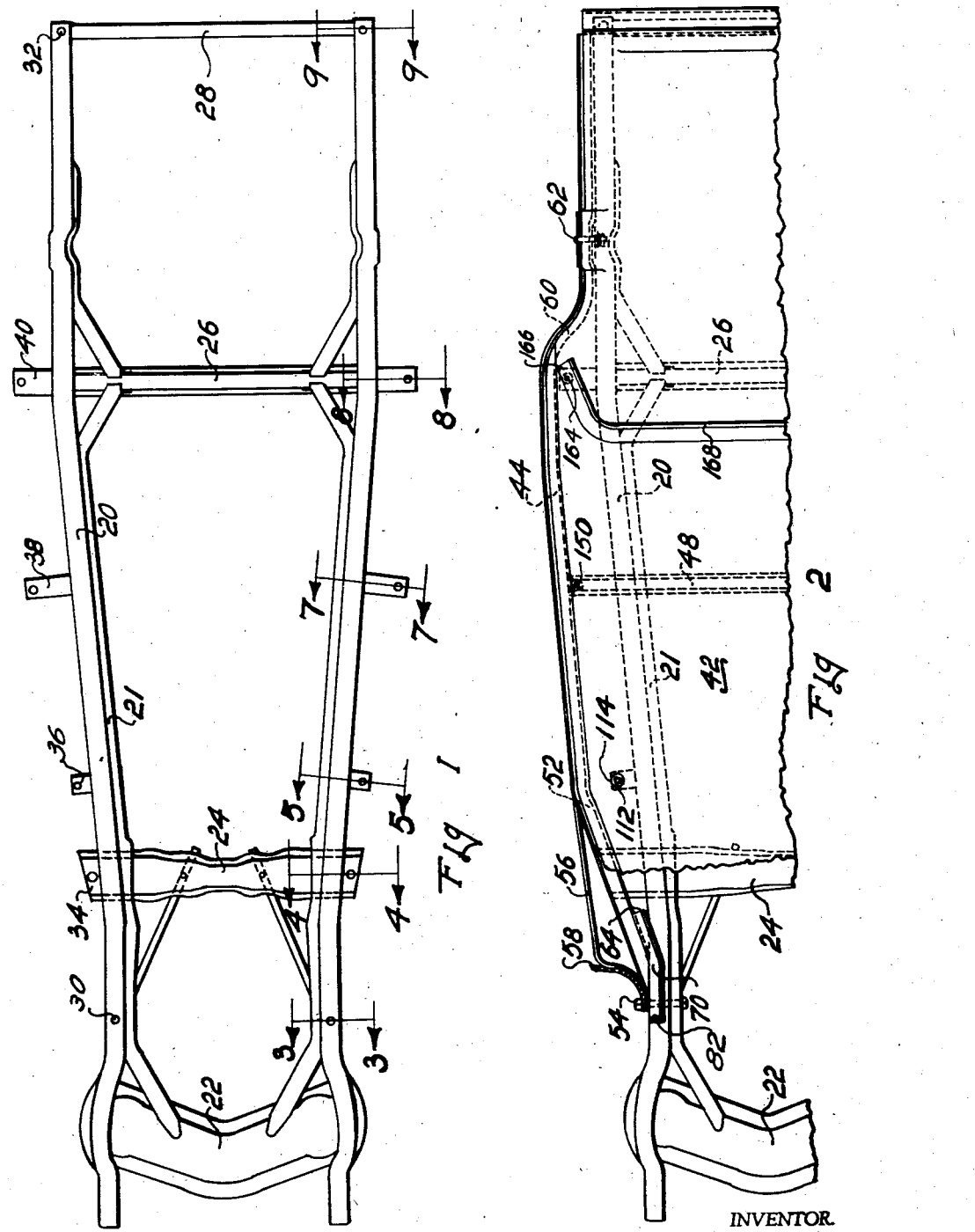
INVENTOR.
FLOYD F. KISHLINE
BY
ATTORNEY.

Sept. 4, 1945. F. F. KISHLINE 2,384,096
BODY MOUNT
Filed Nov. 14, 1940 3 Sheets-Sheet 2
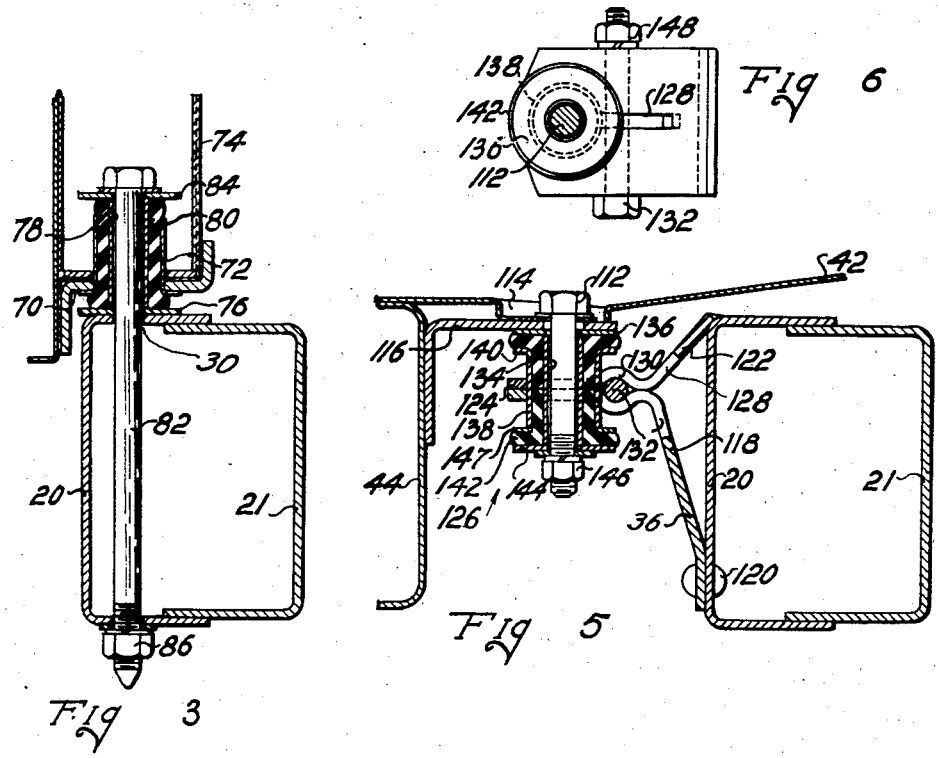
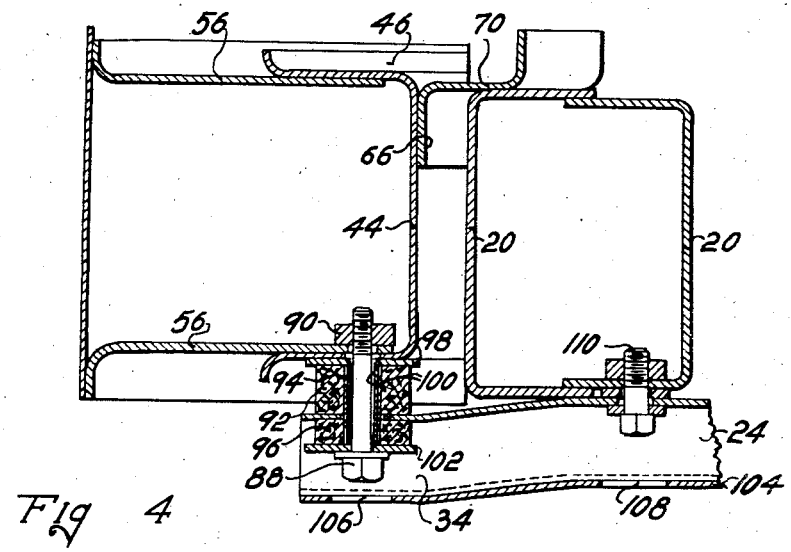
INVENTOR.
FLOYD F. KISHLINE
BY Carl J. Barbee
his Attorney Sept. 4, 1945.  F. F. KISHLINE  2,384,096
BODY MOUNT
Filed Nov. 14, 1940   3 Sheets-Sheet 3
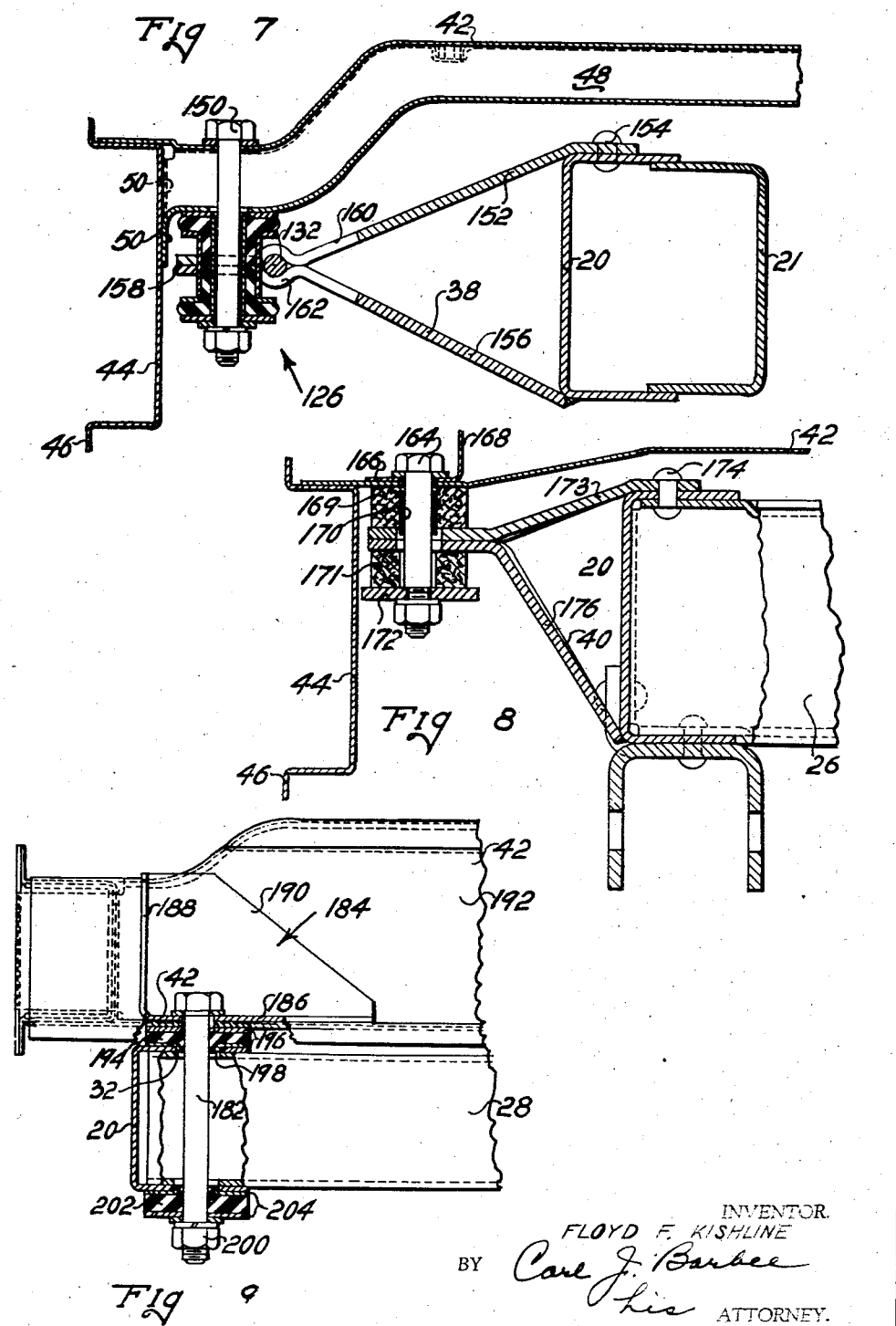
INVENTOR.
FLOYD F. KISHLINE
BY
ATTORNEY.

Patented Sept. 4, 1945

2,384,096

UNITED STATES PATENT OFFICE 2,384,096

BODY MOUNT

Floyd F. Kishline, Kenosha, Wis., assignor to Nash-Kelvinator Corporation, Kenosha, Wis., a corporation of Maryland Application November 14, 1940, Serial No. 365,611

15 Claims. (Cl. 296—35)

This invention relates to means for holding a vehicle body upon the chassis frame of the vehicle and has particular reference to means for mounting an automobile body upon a frame.

It is an object of this invention to provide mounting means which will permit the strengthening properties of the body to increase the rigidity of the frame.

It is another object of this invention to provide body mounting means which will transmit less noise to the body from the frame.

It is another object of this invention to provide body mounting means which will prevent the transmission of shocks from the frame to the body.

It is another object of this invention to provide flexible body mounting means which may be installed in an automobile without overloading any one of the body mounts.

It is another object of this invention to provide flexible body mounting means which will prevent misalignment strains from being set up between the frame and the body.

It is another object of this invention to provide body mounting means which will compensate for manufacturing errors in the construction of the frame and body.

It is another object of this invention to provide a body mount which may be installed in a plurality of different positions.

Other objects and advantages of this invention will be apparent from a consideration of the following description and claims and the attached drawings, of which there are three sheets, and in which—

Figure 1 represents a plan view of an automobile chassis frame;

Figure 2 represents a plan view of the frame illustrated in Figure 1 with the underbody of the automobile in place thereon;

Figure 3 represents a sectional view taken along a plane indicated by the line 3—3 in Figure 1, looking in the direction of the arrows, and including a portion of the body attached thereto;

Figure 4 represents a sectional view taken along a plane indicated by the line 4—4 in Figure 1, looking in the direction of the arrows, and showing a portion of the underbody of the automobile mounted thereupon;

Figure 5 represents a sectional view taken along a plane indicated by the line 5—5 in Figure 1, looking in the direction of the arrows, and showing a portion of the body of the automobile thereon;

Figure 6 represents a plan view of the bracket and clamping means shown in Figure 5;

Figure 7 represents a sectional view taken along a plane indicated by the line 7—7 in Figure 1, looking in the direction of the arrows, and including a portion of the body mounted thereon;

Figure 8 represents a sectional view taken along a plane indicated by the line 8—8 in Figure 1, looking in the direction of the arrows, and showing a portion of the body of the automobile thereon; and Figure 9 represents a sectional view taken along a plane indicated by the line 9—9 in Figure 1, looking in the direction of the arrows, and showing a portion of the automobile body mounted thereon.

Automobile manufacturers have for some time attempted to reduce the amount of noise and vibrations within the automobile body by employing some sort of flexible mounting means between the body and the chassis frame which supports the body. These flexible mountings have taken the form of rubber or fabric pads between the body and the frame and in some cases mountings have been used in which rubber bushings are compressed and expanded by bolts so that the connection between the body and the frame is completed through rubber which is expanded tightly into contact with parts of the body and the frame. This latter type of mounting is known to the trade as a "Harris bushing."

This invention provides a novel type of body mount in which "Harris" type bushings are mounted in such a way as to be engageable with the frame or body in a plurality of positions. Under theoretically perfect manufacturing conditions, the automobile body and frame will fit together exactly as designed; however, it is impractical to hold the various dimensions of the frame and body to such close limits and there consequently are errors in manufacture which cause the body and frame to be slightly out of relative alignment both in a horizontal plane and in a vertical plane. Generally, this invention provides means for mounting each side of the body upon the frame at two spaced points and then clamping the intermediate portions and ends of the body to the frame by means of "Harris" bushings which can be clamped to the frame in various vertical positions depending upon whether the body is high or low relative to the frame.

The drawings illustrate an automobile frame having side members 20 which are formed into hollow cross section in their middle portion by the filler rails 21 and which are joined by a front cross member 22 and rear motor support cross member 24, an intermediate cross member 26 and a rear cross member 28. The front end of the body is arranged to rest over apertures 30 in the side members 20 while the rear end of the body is arranged to rest over the apertures 32 in the side members and the rear cross member 28. Between the front and rear apertures 30 and 32 are provided a series of body mounting brackets. The first bracket behind the front aperture 30 or the number 2 bracket is formed at 34 by extending the ends of the rear motor support cross member 24 beyond the sides of the frame. The number 3 bracket is illustrated at 36 in Figures 1, 2 and 5 and is secured to the outside of the side members 20 in a manner which will be more particularly described later. The number 4 bracket illustrated at 38 is similar to the number 3 bracket and is shown in Figures 1, 2 and 7. The number 5 bracket indicated at 40 is shown in Figures 1, 2 and 8.

The automobile body is built up upon an underbody structure consisting of a floor pan 42, the edges of which rest upon a side rail 44. The manner in which the doors and side walls of the body are mounted upon the underbody structure does not form a part of this invention and is therefore not shown in the drawings.

The side rail 44 of the underbody consists of an outwardly opening channel section having vertical flanges 46 turned outwardly from the top and bottom thereof. The edges of the floor pan 42 are secured as by welding along the top edge of the side rail 44. The floor pan is further supported by means of a cross brace 48 which has an upwardly opening channel shaped cross section and is secured as by welding to the undersurface of the floor pan. The ends of the cross brace 48 are flanged outwardly as at 50 (see Figure 7) and are welded to the sides of the side rail members 44. The side rails 44 are positioned outwardly from the sides of the side members 20 of the frame so as to increase the width of the body. Toward the front of the automobile the side rail members 44 are bent inwardly toward the frame as at 52 (see Figure 2) until they are adjacent to the outside surface of the side members 20 where they are arranged to be secured to the frame by means of the transverse bolt 54. The side walls of the body are continued forward of the point 52 in generally parallel relationship to the frame 20 and the filler rail members 44 and the inner edge of the body panels. A wheel house panel 58 is provided along the forward edge of the body and plates 56.

Toward the rear of the body and just behind the intermediate cross member 26 the side rail member 44 is curved sharply inwardly as at 60 to a point adjacent to the frame 20 where the body is secured to the frame by means of a transverse bolt 62. A suitable wheel house panel serves to close the channel shaped section of the side rail 44 into a box section to the rear of the number 5 body supporting bracket. The transverse bolts 54 and 62 are passed through holes in the body which are large enough to register with the holes in the frame regardless of manufacturing inaccuracies in the body. The functions of the bolts 54 and 62 is to locate transversely the body on the frame. Suitable fabric or rubber washers may be provided around the bolts 54 and 62 between the frame and body.

A reinforcing member 64 is secured to the inside of the side rail 44 at the forward end thereof and has a horizontal surface 70 which rests over the aperture 30 in the frame. The horizontal surface 70 defines an aperture within which is pressed the flanged sleeve 72 (see Figure 3). The sleeve 72 projects upwardly through the reinforcing member 64 and through the lower end of a brace 74 which forms a part of the body. The bushing which is positioned within the sleeve 72 consists of a lower washer 76 which has the tube 78 attached thereto by bending the end of the tube over the inside edge of the washer. The tube 78 serves to space the tubular rubber insulator 80 from the bolt 82. A washer 84 is positioned around the bolt 82 on top of the insulator 80 and the upper end of the tube 78. The bolt 82 extends downwardly through the side member 20 of the frame and is drawn down tight by means of the nut 86. It is thus evident that when the nut 86 is tightened, the rubber insulator 80 will be compressed between the washers 76 and 84, thus expanding the insulator between the sleeve 72 and the tube 78 so that the connection between the body and the frame is from the bolt 82 and tube 78 through the rubber insulator 80. The connection functions as an ordinary "Harris" bushing to transmit the body loads to the frame by means of shear loads in the body insulator. Attention is called to the fact that the insulator 80 is considerably longer than the sleeve 72 so that even though the body and sleeve 72 are high with respect to the frame, the insulator will project through the sleeve and will grip the sleeve in any position it occupies vertically with respect to the sleeve when compressed. The tube 78 engages the washer 84 to limit to a predetermined amount the degree of compression in the insulator 80.

The number 2 body bolt is most clearly illustrated in Figure 4 and consists of a stud bolt 88 which is passed upwardly through the extended end 34 of the rear motor support cross member 24 and is threaded into a boss 90 secured on the inside surface of the filler plate 56, which is in turn secured as by welding inside of the side rail 44 of the body. The bolt 88 is spaced from the cross member 24 by means of a fabric washer 92 which is mounted on top of the cross member 24. The washer 92 has a metal sleeve 94 which projects below the washer and centers the washer with respect to a second fabric washer 96 positioned below the aperture in the cross member 24. A metal washer 98 is positioned on top of the fabric washer 92 and is provided with a metal tube 100 which extends downwardly through the sleeve 94 and abuts against a lower metal washer 102 carried between the lower fabric washer 96 and the head of the bolt 88. By turning the bolt 88 into the threaded boss 90 the fabric washers 92 and 96 may be compressed to a degree which is predetermined by the length of the sleeve 100.

The rear motor support cross member 24 is channel shaped in cross section and has its open face closed by a plate 104 to form a hollow box section. The plate 104 is apertured as at 106 so that a wrench may be applied to the bolt 88 and as at 108 so that the bolt 110 which secures the cross member to the frame 20 may be tightened.

The number 3 body bolt is most clearly illustrated in Figures 5 and 6 which show the bolt 112 to be passed downwardly through a cup shaped depression 114 in the floor pan 42 and through the bracket 36. A reinforcing clip 116 is welded to the inside of the side rail 44 and the underside of the cup shaped depression 114 to strengthen the bearing surface of the bolt on the floor pan.

The bracket 36 consists of a lower arm 118 secured to the frame 20 by the rivet 120 and an upper arm 122 which is secured as by welding to the upper edge of the frame 20. The arms 118 and 122 are bent horizontally outward as at 124 and define an aperture within which is received the bushing generally indicated at 126. Each of the arms 118 and 122 are slotted as at 128 and provided with oppositely bent out portions 130 which are arranged to receive a bolt 132. The horizontal portions 124 of the two arms are welded together.

The bushing 126 consists of an inner metal tube 134, the upper end of which is secured to a metal washer 136 and an outer sleeve 138 which is provided with an outturned flange 140 at the upper edge thereof. Positioned between the outer sleeve 138 and the tube 134 are a pair of flanged rubber insulators 142 which are compressed between the upper metal washer 136 and a lower metal washer 144 by tightening up the nut 146 on the lower end of the bolt 112. An annular metal washer 147 is provided between the lower end of the sleeve 138 and the flange of the lower insulator 142. The insulators 142 may be compressed to a degree predetermined by the length of the inner metal tube 134, the lower end of which abuts against the washer 144 to prevent further compression of the rubber. The compression of the insulators tightly clamps the rubber between the inside of the sleeve 138 and the outside of the tube 134. It will be noted that the compressing of the insulators 142 just explained is entirely independent of the position of the bushing 126 within the bracket 118. After the bushing 126 has been compressed to the desired degree, the horizontal portions 124 of arms 118 and 122 may be contracted around the outer sleeve 138 by tightening the nut 148 on the bolt 132 (see Figure 6). The slot 128 in the arms 118 and 122 allows the portions 124 of arms 118 and 122 to be deformed sufficiently to tightly grip the outside of the sleeve 138 in whatever position the bushing 126 may be with respect to the horizontal portions 124 of arms 118 and 122.

The number 4 body bolt is most clearly illustrated in Figure 7 and is shown to consist of a bolt 150 passed downwardly through the floor pan 42 and the transverse brace 48 through a bushing generally indicated at 126 which is the same as the bushing 126 just described in connection with the number 3 body bolt. The number 4 body bolt is connected to the frame by means of the bracket 38. The bracket 38 consists of an upper arm 152 secured to the top of the frame 20 by rivets 154 and a lower arm 156 secured to the lower edge of the frame 20 as by welding. The arms 152 and 156 extend diagonally outward from the frame and are bent into a horizontal portion 158 which is apertured to receive the bushing 126. The arms are also slotted as at 160 and provided with oppositely bent out portions 162 arranged to receive a bolt 132 for clamping the bracket to the bushing 126.

The number 5 body bolt is most clearly shown in Figure 8 and consists of a bolt 164 passed downwardly through a flange 166 formed on the lower edge of a seat supporting panel 168 which is welded to the upper surface of the floor pan 42. The bolt 164 extends through a fabric washer 169 which is centered over an aperture in the bracket 40 by the metal sleeve 170. A second fabric washer 171 is positioned below the bracket 40 and clamped in place by the washer 172. It will be noted that the bolt 164 is shouldered to engage the washer 172 to limit the degree to which the fabric washers may be compressed. The bracket 40 which supports the washer 169 on the frame 20 is of similar construction to the brackets 30 and 38, having an upper arm 173 secured to the frame 20 by rivets 174 and a lower arm 176 welded to the lower edge of the frame 20. The arms are apertured as at 178 to pass the bolt 164 and sleeve 170 but they are not slotted as it is not necessary for them to be deformed around the washers.

The rear body bolt is most clearly illustrated in Figure 9 and consists of a bolt 182 passed downwardly through a reinforcing bracket 184 and the frame 20. The bracket 184 has a lower face 186 which is welded to the floor pan 42, a side face 188 bent at right angles from the lower face 186 and a forward face 190 welded to a raised portion 192 of the floor pan 42. A rubber pad 194 is positioned between the bottom of the floor pan 42 and the upper surface of the frame 20. The pad 194 has the metal plates 196 bonded to each side thereof, the lower of which defines an annular flange 198 which fits within the aperture 32 in the frame to center the pad over the aperture. The bolt 182 extends completely through the frame 20 and is provided with a nut 200 on the lower end thereof. A second rubber pad 202 is provided between the nut 200 and the lower surface of the frame 20. The pad 202 is provided with metal surfaces 204 bonded to it in the same manner as is the pad 194. The rubber pads separate the bolt 182 and the body from the frame so that there is no metallic connection between the frame and the body through which noise and vibration may travel.

In assembling the body on the frame, the number 5 and the number 2 body bolt brackets form the initial support for the body on the frame. The body is so designed that with the body thus resting upon the frame, the position of the intermediate and end mounting points will be spaced above their corresponding brackets on the frame. This assures that, if the unattached portions of the body are lower than designed with respect to the frame due to manufacturing inaccuracies, there will still be room to position the bushings 126 in their supporting brackets and the bushing 80 in the sleeve 72 at the front of the body. The bushings 126 may be positioned loosely in their brackets, after which the body is placed on the frame and the body bolts 82, 112 and 150 are passed through the bushings and drawn down tight to compress the rubber insulators in the bushings. After this is done, the brackets 30 and 38 may be clamped around the bushings 126 by tightening the bolts 132 in whatever position the bushings happen to rest with respect to the brackets. The result is a series of flexible "Harris" type bushing supports along each side of the body to support the intermediate and front portion of the body. The bushings are all compressed to a predetermined degree so that the body loads are equally distributed along the frame. The mounting cannot exert any misalignment strains between the frame and body and no single mounting will be over loaded and compressed. The compression of the various bushings will be maintained below the point at which they will transmit excessive noise to the body. The degree of compression of the rubber bushings which is determined by the length of the metal tubes 78 and 134 is fixed by experiment according to the desired restraints between the body and the frame and according to the desired cushioning and sound deadening effect of the bushings.

The rear body bolt is connected through the back portion of the frame where the side members are not reinforced by the filler rails 21. The frame is thus relatively flexible at this point and can be deformed sufficiently by tightening the bolts 182 to clamp the frame and body together without causing undue stress in the frame or body.

While I have described my invention in some detail, I intend this description to be an example only and not as a limitation of my invention, to which I make the following claims:

1. In an automobile, a frame, a body, bolts attached to said body, deformable insulators compressed around said bolts, and means for clamping said insulators with respect to said frame in any one of a plurality of adjusted positions, said clamping means being releasable without affecting the compression of said insulators.

2. In an automobile having a frame and a body, flanged rubber insulators carried on said body, a metal sleeve mounted around said insulators between the flanges thereof, means secured to said body for expanding said insulators to grip said sleeve upon its ends and inside diameter, and means carried on said frame for clamping said sleeve in any one of a plurality of adjusted positions with respect to said frame.

3. In an automobile, a frame, a body, sound deadening material supporting the front and rear ends of said body on said frame, sound deadening bushings carried by said body in fixed relationship thereto intermediate of said first mentioned supports, and securing means carried by said frame arranged to engage said bushings in any one of a plurality of positions.

4. In an automobile, a body member, a frame member, sound deadening means for supporting the ends of said body member on said frame member, rubber insulators positioned between the ends of said body member, means compressing said insulators against one of said members, and means carried by the other of said members for engaging said compressed rubber insulators in any one of a plurality of positions and independently of said compressing means.

5. An automobile body mount comprising a pair of flanged cylindrical members positioned one within the other, deformable cushioning means positioned between said cylindrical members, means for compressing the ends of said deformable members to expand them into contact with said cylindrical members, and clamping means engageable with the outer of said cylindrical members in any one of a plurality of positions.

6. In an automobile, a frame, a body, bolts passed vertically through portions of said body, rubber bushings compressed around said bolts, releasable means for clamping said bushings with respect to said frame, and other bolts extending horizontally through portions of said body and frame.

7. In an automobile, a body member, a frame member, sound deadening means supporting said body member near the front and rear ends thereof on said frame member, deformable insulators carried by one of said members between the ends of said body member, means carried by said last mentioned member for compressing said insulators, clamping means carried by the other of said members for engaging said deformable insulators in any one of a plurality of positions, and means associated with said deformable insulators for determining the maximum compression thereof.

8. An automobile body mount comprising a pair of flanged cylindrical members positioned one within the other, flanged deformable cushioning means positioned between said cylindrical members, means for compressing said deformable members to expand them into contact with the cylindrical portion of said flanged cylindrical members, means for engaging the outer of said cylindrical members in any one of a plurality of positions, and means cooperable with said compressing means for determining the maximum compression of said deformable members.

9. An automobile body mount comprising a pair of flanged cylindrical members positioned one within the other, flanged deformable cushioning means positioned between said cylindrical members, and means for compressing said deformable means to expand said means into contact with the cylindrical portion of said flanged cylindrical members in any one of a plurality of positions of said cylindrical members relative to each other, said compressing means and one of said cylindrical members being cooperable for determining the maximum compression of said deformable members.

10. In an automobile, a body member, a frame member, sound deadening means supporting the ends of said body member on said frame member, deformable insulators carried by one of said members between the ends thereof, means for compressing said insulators against the member by which they are carried, and clamping means independent of said compressing means and carried by the other of said members for engaging said deformable insulators in any one of a plurality of positions.

11. In an automobile, a body member, a frame member, inelastic supports of sound deadening material under predetermined loads supporting said body member on said frame member at longitudinally spaced points, deformable insulators carried by one of said members to the front and rear of one of said inelastic supports, and means for expanding said deformable insulators to engage the other of said members in any one of a plurality of adjusted positions.

12. In an automobile, a frame member, a body member arranged to be positioned over said frame member, inelastic sound deadening material for supporting said body member on said frame member at one point, a deformable insulator carried by one of said members and spaced from said inelastic support, a sleeve positioned around said deformable insulator, means connected to said last mentioned member to expand a portion of said insulator to grip said sleeve, means carried by the other of said members for engaging said sleeve in any one of a plurality of positions, a second sleeve carried by one of said members at a point spaced from said inelastic support and on the opposite side thereof from said deformable insulator, a second deformable insulator positioned within said second sleeve and extending beyond the ends thereof, and a bolt extending through said second deformable insulator and the other of said members, said bolt being arranged to expand said second deformable insulator to grip the inside of the second of said sleeves.

13. In an automobile, a frame member, a body member, deformable cushioning members, means for attaching said cushioning members to one of said first mentioned members, a retainer for said cushioning members, said attaching means being operable to deform said cushioning members to a predetermined amount to grip said retainer, and means for attaching said retainer to the other of said first mentioned members in any one of a plurality of adjusted positions said retainer may occupy relative to said member after being deformed whereby said body member is supported on said frame member by sheer loads in said deformable members.

14. In an automobile, a frame, a body, a bolt passed through said body, an inner grommet clamped endwise around said bolt and having a rubber bushing telescoping the inner grommet and compressed by said bolt and grommet against said body, an outer grommet surrounding said bushing, and a frame-supported eye clamped upon the outside diameter of said outer grommet, said bushing engaging said grommets tightly in a radial direction to prevent relative movement between the engaging surfaces of said grommets and bushing, and said inner grommet having a loose fit at its inside diameter upon said bolt.

15. In an automobile, a frame, a body, sound deadening material under a predetermined compression supporting said body on said frame at points spaced longitudinally thereof, deformable insulators carried by said body at different points spaced longitudinally of said body, brackets surrounding said insulators, securing means engageable wtih said brackets in any one of a plurality of positions, and means expanding said insulators into engagement with said brackets to support said body thereof through shear in the material of said insulators.

FLOYD F. KISHLINE.